J. P. FARLEY.
BACKWATER CELLAR DRAIN.
APPLICATION FILED NOV. 29, 1912.
1,088,066.
Patented Feb. 24, 1914.
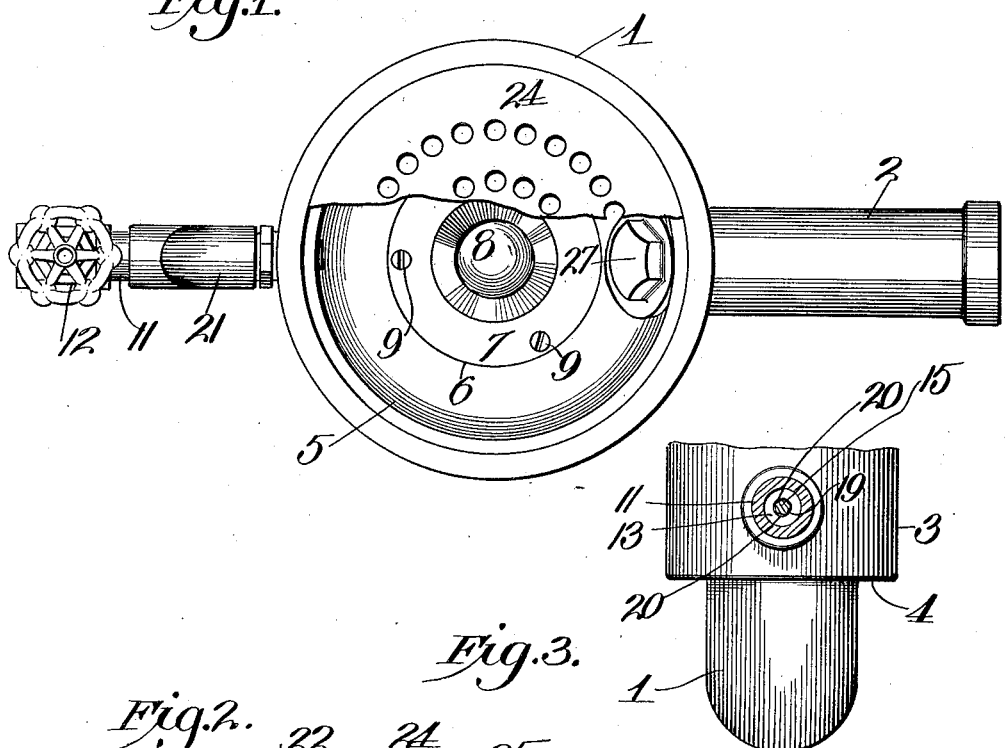
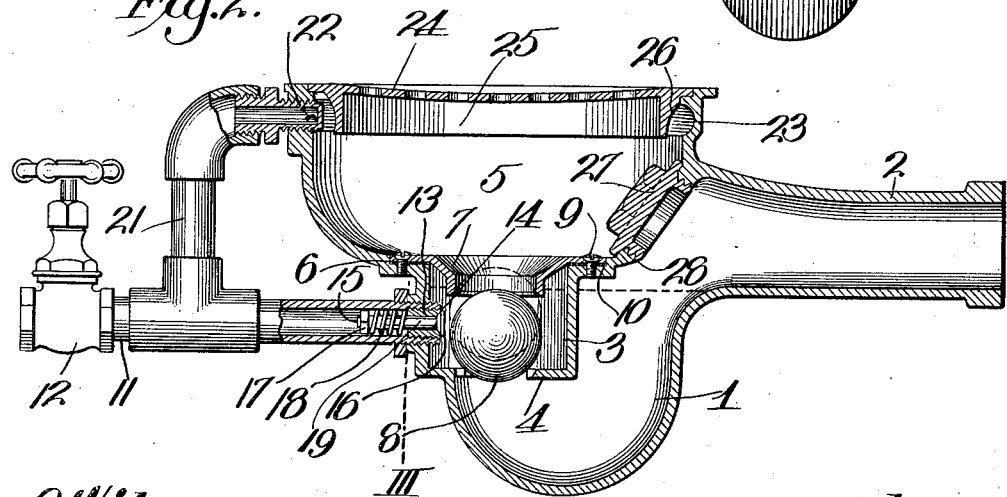
Witnesses
Frank R. Glan
H. C. Rodgers.
Inventor
J. P. Farley
By George Y. Thorpe Atty.

UNITED STATES PATENT OFFICE.

JOHN P. FARLEY, OF KANSAS CITY, MISSOURI.

BACKWATER CELLAR-DRAIN.

1,088,066.   Specification of Letters Patent.   Patented Feb. 24, 1914.

Application filed November 29, 1912. Serial No. 734,073.

*To all whom it may concern:*

Be it known that I, JOHN P. FARLEY, a citizen of the United States, residing at Kansas City, in the county of Jackson and State of Missouri, have invented certain new and useful Improvements in Backwater Cellar-Drains, of which the following is a specification.

This invention relates to back-water cellar drains, of that class known as the shallow or dry-pan drain and embodying a ball float valve confined in the mouth of the trap and below the discharge opening of the pan for the purpose of sealing the last-named opening against back water from the sewer, and my object is to produce a drain of the character above outlined provided with means whereby the ball float can be kept whirled or agitated when desired, for the purpose of preventing slime and other matter accumulating on the ball and eventually preventing it from seating properly and thus permitting gas from the sewer to back up into the pan.

With this general object in view, the invention consists in certain novel and peculiar features of construction and organization as hereinafter described and claimed; and in order that it may be fully understood reference is to be had to the accompanying drawing, in which—

Figure 1, is a top plan view of a back water cellar drain embodying my invention. Fig. 2, is a central vertical section of the same. Fig. 3, is a cross section on the dotted line III of Fig. 2.

In the said drawing where like reference characters identify corresponding parts in all the figures, 1 is a trap having a discharge portion 2, for communication with the drain pipe or sewer, not shown. At its opposite end the trap has an enlargement or mouth 3 provided with a perforated bottom 4 and communicating at its upper end with a shallow pan 5, and said pan around its point of communication with the mouth 3 of the trap is provided with a shallow recess 6, to receive the outwardly projecting flange of a funnel 7 depending into the mouth 3, and forming a downwardly disposed valve seat for engagement by a ball float 8, located in said mouth and incapable of passing through the perforated bottom thereof. The funnel is secured rigidly in place by clamping screws 9, and the joint between the funnel and the trap and pan is made liquid and gas tight by means of the interposed gasket 10.

11 is a water supply pipe communicating with the head of the trap and controlled by any suitable type of valve, for instance by the hand-operated valve 12.

13 is a short pipe section screwed into the pipe 11 and flared at its discharge end as at 14, and extending slidingly through said pipe is the stem 15 of a valve 16, the latter being beveled to correspond with and fit snugly against the flaring end or seat 14.

17 is a nut screwed on the stem and 18 a coiled spring fitting around the stem and bearing at its opposite ends against the pipe section or tube 13 and nut 17 for the purpose of holding the valve against its seat 14, and in order that water permitted to flow through pipe 11, may engage and unseat the valve and thus gain access to the mouth of the trap, the stem of the valve is flattened at 19 for the greater part of its length so as to provide passages 20 through which the water may pass through the tube 13 to engage the valve. It will thus be seen that when the valve 12 is opened, water is discharged or sprayed against the ball 8 by reason of the flare of the seat 14 and tapering of the valve 16, the impact on the ball causing it to turn or whirl with sufficient rapidity to guard against slime adhering to it and eventually interfering with the proper performance of its function.

As a means of keeping the interior of the pan clean, a pipe 21 branches from pipe 11 into the pan near the upper margin thereof and is provided with opposite discharge holes 22 through which the water shall escape horizontally into the internal circumferential groove 23 in the pan and to compel the water to make a complete circuit of the pan, and restrain it from splashing upward therefrom the ordinary drain plate 24 covering the pan is provided with depending circular flange 25, circumferentially grooved at 26, the two grooves 23 and 26 forming a channel of sufficient capacity to accommodate the water discharged in both directions from pipe 21. The flange 26 also tends to compel the water as it passes downward within the pan to hug the interior thereof and thus insure its thorough cleansing.

For clean-out purposes a plug 27 is mounted in the opening 28, establishing communication between pan 5 and portion 2 of the trap.

Under normal conditions, the trap stands charged with water and holds the valve upwardly against the overlying valve seat, so that it shall prevent water backing up into the pan, and coöperate with the water in the trap in preventing noxious gases escaping upwardly into the pan. When water is poured into the trap, it depresses the ball and the trap overflows to the sewer, sufficient water remaining of course to reseat the valve and maintain the seal, it being understood that the position which the ball occupies in full lines Fig. 3, is that which it occupies while water is flowing through the trap from the pan to the sewer, and that the ball float when thus depressed does not close the perforation of bottom 4, and hence does not prevent the water flowing through the trap.

At intervals the apparatus can be thoroughly flushed out and cleaned by opening valve 12 and permitting water under pressure to enter the pan and the mouth of the trap, it being apparent that when the valve 12 is opened, the pressure in the pipe 11 will unseat valve 16 and spray the water upon the ball valve at an angle to the surface thereof and thus compel the same to whirl rapidly and thus relieve itself of any matter accumulated thereon, and should the water back up from the sewer at any time, the valve will engage the overlying seat and the valve 16 will prevent the water from the sewer by-passing through pipes 11 and 21 into the pan.

From the above description it will be apparent that I have produced a back-water cellar drain embodying the features of advantage enumerated and I wish it to be understood that I reserve the right to make all changes properly falling within the principle of the invention as defined by the appended claims.

I claim:—

1. A back-water cellar drain, comprising a pan, a trap communicating at one end with the pan, a downwardly-disposed valve seat and a float valve to engage the same and thereby normally closing communication between the pan and trap, a pipe for discharging water under pressure against said float valve to impart movement to the same for cleansing purposes, and a yieldingly seated valve adapted to open under pressure of water from said pipe and to close when such water is cut off to prevent water backing into said pipe from the trap.

2. In a back-water cellar drain, a pan, a trap and a downwardly-facing valve-seat, a spherical float valve adapted to be held by water in the trap against said seat, a pipe for discharging water into the trap in a plane below said valve seat, means to maintain the ball in the plane of said pipe when the valve is not in engagement with said valve-seat, and a check valve mounted in said pipe to prevent water entering the latter from the trap and to open under pressure of water in said pipe.

In testimony whereof I affix my signature, in the presence of two witnesses.

JOHN P. FARLEY.

Witnesses:
 HELEN C. RODGERS,
 G. Y. THORPE.

---

Copies of this patent may be obtained for five cents each, by addressing the "Commissioner of Patents. Washington, D. C."